J. HAINES.
Harvester.
No. 331.
Reissued Nov. 6, 1855.
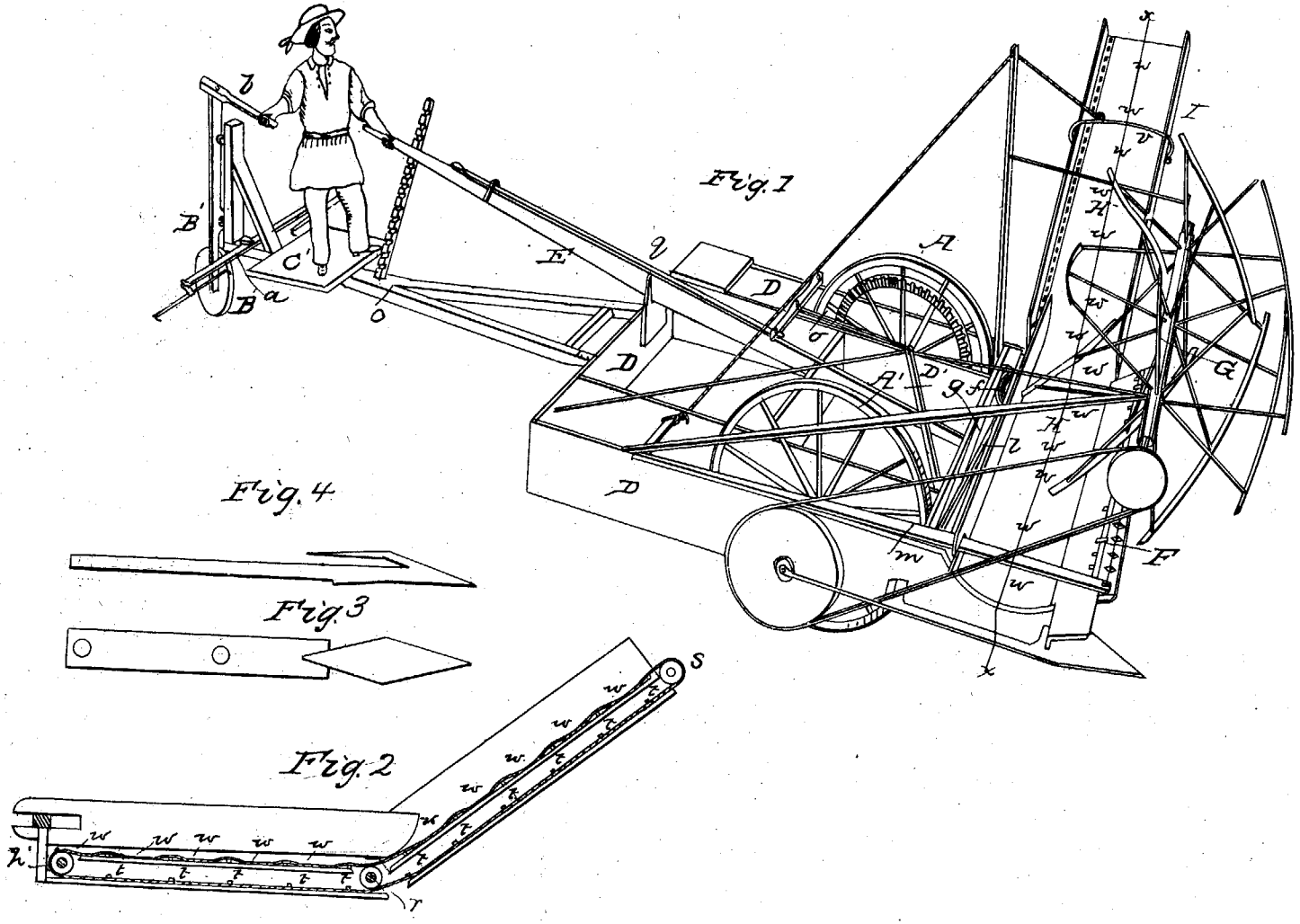
N. PETERS, Photo-Lithographer, Washington, D. C.

UNITED STATES PATENT OFFICE.

JONATHAN HAINES, OF PEKIN, ILLINOIS.

IMPROVEMENT IN HARVESTING-MACHINES.

Specification forming part of Letters Patent No. 6,245, dated March 27, 1849; Reissue No. 331, dated November 6, 1855.

*To all whom it may concern:*

Be it known that I, JONATHAN HAINES, formerly of Union Grove, in the county of Whiteside and State of Illinois, but now of Pekin, in the county of Tazewell and State aforesaid, have invented certain new and useful Improvements in Harvesting-Machines for Grain or Grass; and I do hereby declare the following to be a full, clear, and exact description of the same, reference being had to the accompanying drawings, making a part thereof, in which—

Figure 1 represents a view of the entire machine. Fig. 2 is a vertical section taken through the line *x x* of Fig. 1. Fig. 3 is a plan, and Fig. 4 a side elevation, of one of the slotted fingers, which advance before the sickle for the purpose of supporting the straw while the knife cuts it off.

Where the same letters occur in the several figures they denote like parts.

The leading difficulty in all harvesting-machines the cutters of which were raised or lowered by a lever previous to my invention was the very great excess of weight on the forward part of the machine, which ultimately came upon the necks of the horses. To obviate this great difficulty resort was had to an extra truck or pair of trucks forward of the machine, which, besides its additional cost, caused the team to be placed so far in advance of the machine as to make it impossible to turn a square corner without backing the team. If the team were harnessed directly to the tongue and the machine properly balanced on its wheels, a corner could be as readily turned by it as by an ordinary cart; but with the former heavy weight forward the driver alone could not properly control the machine, and to place an additional attendant on the machine involved additional weight on the machine at an additional daily cost to the user.

The object of my invention is to avoid these serious consequences by relieving the team of all undue work, and economizing to the user, both in the cost of the machine and the daily expense of using it.

The nature of my invention consists in combining, with the frame of a harvesting-machine so hung upon a pair of supporting-wheels as to be nearly balanced thereon when on level ground, a hinged tongue and operating-lever, which lever shall be attached to one and project toward the driver's seat or stand arranged on the other so that the driver, who is the sole conductor of the machine, may from said stand or seat raise or depress the cutters at pleasure during the operation of the machine, for cutting the grain or grass at any suitable height above the ground, or for passing over any intervening obstacles; and also in combining with a harvesting-machine a conveyer which first carries the cut grain horizontally across the machine, and then elevates it so as to discharge it into the bed of a wagon driven alongside of the machine when the conveyer-frame is connected to the bed by a flexible joint, for purposes which will be described.

To enable others skilled in the art to make and use my invention, I will proceed to describe the same with reference to the drawings.

In the accompanying drawings the machine is represented as being mounted upon three wheels, the two in front, A′ A′, sustaining the principal part of the weight, the one behind, B, being chiefly designed for steering, and in order that it may the better accomplish that object it is mounted in a vertical post, B′, which is hung upon hinges and capable of being turned by a tiller, *b*, in manner of the rudder of a vessel.

The horses are harnessed to the whiffletrees *a*, which are secured by a bolt to the tongue C and push the machine before them. The tongue C is hinged to the rear end of the square part D of the frame-work, and the lever E, which projects back from the frame, is engaged by means of a catch to the notches in the sides of the post *c*, erected upon the tongue, this catch being so constructed that it can with ease be disengaged and re-engaged.

The frame D rests upon the axles of the wheels A A′, which form a fulcrum upon which it turns, and the projecting lever E being attached firmly to this frame, whenever it is raised or lowered it depresses or elevates the front of the machine, and thus determines the height at which the grain or grass is to be cut, the catch which engages the arm to the notched post C holding it any point of elevation at which it may be required to place it.

A platform, C′, is placed upon the rear end of the tongue, upon which the driver, who is the sole conductor of the machine, stands, convenient to the tiller *b* and the lever E, in order that he may direct the course of the machine and raise and lower the cutter to accommodate it to the variations in the surface of the ground or the height of the grain, by this means avoiding both waste of the grain and the inconvenience of cutting too much straw.

The principal frame D may be made of plank or scantling well framed together. It carries the sickle F, reel G, conveyer H, and the gearing which puts them severally in motion.

Upon the wheel A, or upon its axis, a cog-wheel, *d*, is secured, which takes into and drives the pinion *e*, (represented in dotted lines,) upon whose axis is a pulley, *f*, which, through the medium of the belt *g*, turns the axis *h*, Fig. 2, which carries the wheel *i*, Fig. 2, that drives the conveyer H.

To the side of the pulley *f* a crank-pin, *k*, is secured, which, through the connecting-rod *l*, communicates a horizontal vibrating motion to the lever *m*, which is transmitted to the sickle F, connected by a pivot, *n*, to its front end.

The axis of the pinion *e* is capable of sliding longitudinally on its bearings sufficiently far to disengage it from the wheel *d*, when the machine is required to be moved, without putting the conveyer or sickle in motion. For the purpose of disengaging and re-engaging this pinion with facility the forked end of a rod, *o*, is engaged, either to it or the shaft, by any of the usual modes, the other end of this rod being jointed to the lever *p*, which is pivoted to the frame D at one end and jointed to the rod *q* at the other, the latter resting upon the lever E and extending back far enough to be within the reach of the conductor. This rod is provided with two catches which, when engaged, will respectively hold the pinion *e* in or out of gear with the wheel *d*.

The endless conveyer H is for the purpose of elevating the cut grain into the bed of a wagon which accompanies the machine to receive the same. That portion of the conveyer which is immediately behind the sickle is horizontal; but the part projecting beyond the side of the machine is inclined at a suitable angle for raising the grain over the side of the box of the accompanying wagon. That part I of the frame in which the inclined part of the conveyer is supported is hinged to the side of the frame D, as seen in Fig. 2, and its outer end is raised and lowered by the cord U, passing through a slot or notch in the top of the post J and secured to a bail, *v'*, which arrangement renders the conveyer capable of elevating the grain to different heights, and also allows the frame I to yield when it comes in contact with obstructions that might break it if it were rigidly connected to the frame. The conveyer consists of two parallel endless belts passing round the driving pulley or wheel *i*, the bearing-pulley *r*, and the stretching-pulley *s*. These belts are held at the proper distance apart by slats *t*, and the whole is covered by a web of cloth which is loose enough to bag down between the slats, forming a series of shallow depressions, *w*, which retain any grain that may be shelled out by the action of the sickle or reel until discharged into the wagon-box, a great deal of which grain would roll off the sides of the cloth if it were tightly stretched over the slats. These shallow bags also render the conveyance of the grain up the apron when its inclination is very steep much more certain and regular.

The reel G is made and arranged in the usual or in any suitable manner, and receives its motion from the wheel A' through the belt *x*.

The slotted fingers *y*, Figs. 3 and 4, for dividing the grain, supporting it while being cut, and preventing the sickles getting damaged from sticks, stones, and other obstructions against which the machine may happen to run, are secured to a bar which extends across the front end of the machine at suitable distances apart. The front ends of these fingers are inclined downward, in order that when the grain is pressed against them by the sickle or knife it may be pulled slightly upward, which favors the cutting very much and greatly diminishes the force required to effect it.

This machine is mainly designed for harvesting grain by cutting off the heads and leaving the straw upon the ground, the heads being elevated by the conveyer and discharged into the box of a wagon. The heads of grain thus gathered are either stacked in the open air or garnered in a barn, as may be deemed expedient. If the grain, when cut, is not ripe enough to be garnered, the sickle may be lowered as to cut the straw at the usual height from the ground, and the conveyer placed in a horizontal position, so as to lay the grain in a swath, where it may be allowed to remain until cured, or it can be bound in sheaves in the usual way.

To adapt the machine for cutting grass for hay it is merely requisite to lower the sickle as near the ground as possible without running onto it.

As the machine is operated in other respects besides those I have particularly mentioned in the same way that others are, I do not deem it necessary to enter into a detailed description of all the minutia of its management.

Having thus fully described the nature of my invention, what I claim therein as new, and desire to secure by Letters Patent, is—

1. In combinination with a frame nearly balanced on its supporting-wheels and a tongue hinged to said frame, a lever connected to one and projecting toward the driver's stand or seat on the other, so that the driver, who is the sole conductor of the machine, may from said stand or seat raise or depress the cutters at pleasure during the operation of the machine for cutting the grain or grass at any suitable height above the ground or for passing over any intervening obstacles, substantially as described.

2. In combination with the operative parts of a harvesting-machine, a conveyer which first carries the cut grain horizontally across the machine and then elevates it, so as to discharge the grain into the bed of a wagon driven alongside of the machine, when the conveyer-frame is connected to the bed by a flexible joint, in manner and for the purpose described.

JONATHAN HAINES.

Witnesses:
THOMAS H. UPPERMAN,
A. B. STOUGHTON.